United States Patent
Sakai (10) Patent No.: US 9,698,709 B2
(45) Date of Patent: Jul. 4, 2017

(54) MOTOR DRIVING DEVICE (71) Applicant: DENSO CORPORATION, Kariya, Aichi-pref. (JP)

(72) Inventor: Koji Sakai, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 76 days.

(21) Appl. No.: 14/412,252

(22) PCT Filed: Jun. 6, 2013

(86) PCT No.: PCT/JP2013/003552
§ 371 (c)(1),
(2) Date: Dec. 31, 2014

(87) PCT Pub. No.: WO2014/006820
PCT Pub. Date: Jan. 9, 2014

(65) Prior Publication Data
US 2015/0155804 A1 Jun. 4, 2015

(30) Foreign Application Priority Data
Jul. 3, 2012 (JP) .................................. 2012-149723

(51) Int. Cl.
*H02P 6/00* (2016.01)
*H02M 7/5387* (2007.01)
(Continued)

(52) U.S. Cl.
CPC .......... *H02P 6/002* (2013.01); *H02M 7/5395* (2013.01); *H02M 7/53875* (2013.01); *H02P 6/08* (2013.01);
(Continued)

(58) Field of Classification Search
None
See application file for complete search history.

(56) References Cited

U.S. PATENT DOCUMENTS

| 4,788,485 A | * | 11/1988 | Kawagishi | ............ H02M 1/425 318/807 |
| 2005/0194939 A1 | * | 9/2005 | Duff | ....................... H01G 9/155 320/166 |

(Continued)

FOREIGN PATENT DOCUMENTS

| JP | S63190594 A | 8/1988 |
| JP | H02223301 A | 9/1990 |

(Continued)

OTHER PUBLICATIONS

Office Action mailed Aug. 4, 2015 in corresponding JP Application No. 2012-149723 with English translation.
(Continued)

*Primary Examiner* — Eduardo Colon Santana
*Assistant Examiner* — Said Bouziane
(74) *Attorney, Agent, or Firm* — Harness, Dickey & Pierce, P.L.C.

(57) ABSTRACT

A motor driving device includes an inverter circuit having switching elements; and a control device controlling the switching of the switching elements. The control device sets a carrier frequency to f1 when a two-phase modulation scheme is selected, and sets the carrier frequency to f0, which is half of the carrier frequency f1, when a three-phase modulation scheme is selected. Thereby, the frequency of the secondary component of a current flowing in a filter circuit of when selecting the three-phase modulation scheme may be deviated from the resonance frequency of the filter circuit. Accordingly, the current ripple generated in the filter circuit may be reduced even when selectively switching the modulation scheme for the PWM modulation among a plurality of modulation schemes.

5 Claims, 5 Drawing Sheets (51) Int. Cl.
*H02P 27/08* (2006.01)
*H02P 27/06* (2006.01)
*H02P 6/08* (2016.01)
*H02M 7/5395* (2006.01)
*H02P 6/28* (2016.01)
*H02P 6/14* (2016.01)
*H02M 5/458* (2006.01)
*H02M 1/15* (2006.01)

(52) U.S. Cl.
CPC ............... *H02P 6/28* (2016.02); *H02P 27/06* (2013.01); *H02P 27/085* (2013.01); *H02M 1/15* (2013.01); *H02P 2209/13* (2013.01)

(56) References Cited

U.S. PATENT DOCUMENTS

| | | | | |
|---|---|---|---|---|
| 2008/0284367 | A1* | 11/2008 | Kawashima | H02M 1/126 318/700 |
| 2009/0200975 | A1 | 8/2009 | Hayashi | |
| 2011/0243757 | A1* | 10/2011 | Aiba | H02M 7/53875 417/45 |
| 2012/0139461 | A1* | 6/2012 | Suzuki | H02P 27/085 318/400.02 |
| 2012/0292985 | A1 | 11/2012 | Sakai | |
| 2013/0264872 | A1* | 10/2013 | Tago | H02P 27/06 307/31 |
| 2014/0328091 | A1* | 11/2014 | Sakakibara | H02M 5/458 363/37 |
| 2014/0375240 | A1* | 12/2014 | Kawashima | H02P 27/085 318/400.24 |
| 2015/0131346 | A1* | 5/2015 | Kudoh | H02M 7/53873 363/95 |

FOREIGN PATENT DOCUMENTS

| | | | |
|---|---|---|---|
| JP | H10311646 A | | 11/1998 |
| JP | 2008109768 A | * | 5/2008 |
| JP | 2008141856 A | * | 6/2008 |
| JP | 2008141856 A | | 6/2008 |
| JP | 2009189203 A | | 8/2009 |
| JP | 2012157171 A | | 8/2012 |
| JP | 2012244651 A | | 12/2012 |

OTHER PUBLICATIONS

International Search Report and Written Opinion (in Japanese with English Translation) for PCT/JP2013/003552, mailed Aug. 6, 2013; ISA/JP.

* cited by examiner

COMPARISON EXAMPLE

THREE-PHASE MODULATION SCHEME

MOTOR DRIVING DEVICE

CROSS REFERENCE TO RELATED APPLICATIONS

This application is a U.S. National Phase Application under 35 U.S.C. 371 of International Application No. PTC/JP2013/003552 filed on Jun. 6, 2013 and published in Japanese as WO 2014/006820 A1 on Jan. 9, 2014. This application is based on and claims the benefit of priority from Japanese Patent Application No. 2012-149723 filed on Jul. 3, 2012. The entire disclosures of all of the above applications are incorporated herein by reference.

TECHNICAL FIELD

The present disclosure relates to a motor driving device driving a motor using an inverter circuit.

BACKGROUND ART

Conventionally, for example, a motor driving device executes a PWM modulation by switching switching elements of an inverter circuit to convert a direct-current voltage to an alternating-current voltage, and the motor driving device outputs the alternating-current voltage to motor coils of three phases to drive a three-phase motor. In the motor driving device, a modulation scheme of when the PWM modulation is executed, for example, is selectively switched between a two-phase modulation scheme and a three-phase modulation scheme according to a state of a load driven by a motor (e.g., refer to Patent document 1).

PRIOR ART DOCUMENT

Patent Document

Patent Document 1: JP-2009-189203A

SUMMARY OF THE INVENTION

In the motor driving device switching between the two-phase modulation scheme and the three-phase modulation scheme, it is common that carrier-wave frequencies of when the PWM is executed without respect to a switching of the modulation scheme are set to be the same. According to a study of the inventor of the present disclosure, in the motor driving device, when a filter circuit is disposed between a power source of the direct-current voltage and the inverter circuit and has an electrically resonant characteristic, A current ripple generated by a resonance of the filter circuit of when the motor is driven by one of the two-phase modulation scheme or the three-phase modulation scheme may become greater than a current ripple generated by the resonance of the filter circuit of when the motor is driven by the other one of the two-phase modulation scheme or the three-phase modulation scheme. A generation of a large current causes a damage to a condenser element or a coil element in the filter circuit ripple and leads to a short life.

In consideration of the above-described points, and it is an objective of the present disclosure to provide a motor driving device in which a current ripple generated in a filter circuit can be reduced even though a modulation scheme of a PWM modulation is selectively switched from plural modulation schemes.

According to an aspect of the present disclosure, the motor driving device includes an inverter circuit including switching elements corresponding to motor coils of plural phases of a motor, a control device switching the switching elements by using a PWM wave generated by a PWM modulation based on a comparison of a reference carrier wave and a modulation wave that is of an applied voltage command sent to each of the phases and controlling the inverter circuit to convert a direct-current voltage to an alternating-current voltage by the switching and to output the alternating-current voltage to the motor coils, and a filter circuit is disposed in a power supply path from a supply source of the direct-current voltage to the inverter circuit, the filter circuit including a condenser element and a coil element. The control device selectively switches a scheme of the PWM modulation among a plurality of modulation schemes, and the filter circuit becomes an electrically resonant circuit according to the switching. Each modulation scheme of the PWM modulation has a current peak frequency that is a maximum value of a frequency component of a current flowing through the coil element during the switching, and one of the modulation schemes is a resonant inducement modulation scheme. The resonant inducement modulation scheme has the current peak frequency that is closer to a resonant frequency of the filter circuit than that of any other modulation schemes in a uniform frequency mode where carrier-wave frequencies of the reference carrier waves of the modulation schemes are set to be the same. When the control device uses the resonant inducement modulation scheme to execute the PWM modulation, the control device generates the PWM wave by using the reference carrier wave that is different in carrier-wave frequency from the reference carrier wave of the modulation scheme other than the resonant inducement modulation scheme such that a difference between the current peak frequency of the resonant inducement modulation scheme and the resonant frequency becomes greater than that in the uniform frequency mode.

Then, when the PWM modulation is executed in the resonant inducement modulation scheme that most readily electrically resonates with the filter circuit in the uniform frequency mode, the control device changes the carrier-wave frequency such that the current peak frequency and the resonant frequency are deviated from each other relative to the uniform frequency mode, and uses the reference carrier wave that is different in carrier-wave frequency from the reference carrier waves of other modulation schemes. Therefore, in the modulation scheme in which a resonance is most readily generated in the uniform frequency mode, a resonance of the filter circuit can be reduced. In this case, even though the PWM modulation is selectively switched to other modulation schemes, the current ripple generated in the filter circuit can be reduced.

EMBODIMENTS FOR EXPLOITATION OF THE INVENTION

Hereafter, embodiments of the present disclosure will be described referring to drawings. The substantially same parts or components as those in the embodiments are indicated with the same reference numerals and the same descriptions may be omitted. When only a part of a configuration in each embodiment is described, the other parts of the configuration can be configured as the same as a prior embodiment. Further, it is to be understood that the disclosure is not limited to the embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

Referring to FIGS. 1 to 9, an embodiment to which the present disclosure is applied will be described.

Figure 1:
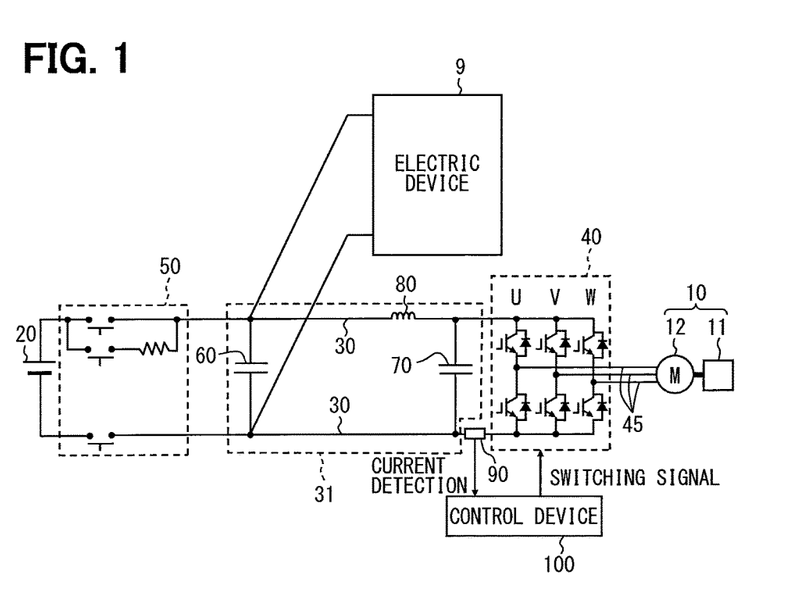
FIG. 1 is a block diagram showing an outline of a motor driving device according to an embodiment of the present disclosure.

As shown in FIG. 1, a motor driving device of the present embodiment drives a synchronous motor 12 of an electric compressor 10. The electric compressor 10 is a compressor arranged in a heat pump circle of a vehicle air-conditioner device using refrigerant such as carbon dioxide, and drives a compression mechanism 11 using the synchronous motor 12 inside of the electric compressor 10. In this case, the compression mechanism 11 is a load. The electric compressor 10 compresses (for example, when the carbon dioxide is used as the refrigerant, a pressure of the refrigerant is compressed to be greater than or equal to a critical pressure) and discharges a gaseous refrigerant in the compression mechanism 11. The synchronous motor 12 according to the present embodiment, for example, is a synchronous motor including four-pole three-phase coils driving and rotating a rotor provided with a magnet.

A direct current power (DC power) 20 as shown in FIG. 1 is an example of a DC voltage power source is made from a high-voltage battery that is capable of outputting a voltage at 288V, for example. A pair of bus lines 30 connected to the DC power 20 and an inverter circuit 40 is provided with a high-voltage relay system 50. The high-voltage relay system 50 is made from plural relays and a resistance. The high-voltage relay system 50 has a function that an inrush current does not flow through the pair of bus lines 30 by switching a path having the resistance to a path without the resistance after a high voltage is applied to the high-voltage relay system 50.

When an abnormal state of the electric compressor 10 is detected, the high-voltage relay system 50 shuts off a power path.

As shown in FIG. 1, the pair of bus lines 30 is an example of a power supply path from the DC power 20 to the inverter circuit 40, and condensers 60 and 70 are interposed therebetween as a smoothing portion. The condenser 60 is provided to smooth a voltage changed according to an effect of an electric device 9 that is connected to the inverter circuit 40 in parallel relative to the pair of bus lines 30. In this case, the electric device 9 may be a motor driving device for a vehicle travel, a charging device, or a step-down DC/DC conversion device.

For example, when plural motor driving devices are mounted to a vehicle and the electric device 9 is the motor driving device for the vehicle travel, the electric device 9 is a primary drive device, and a drive device including the inverter circuit 40 is a secondary drive device, in motor driving devices power supplied from the DC power 20. In this case, for example, the primary drive device is a device to which an input power supplied from the DC power 20 is greater than the secondary drive device. Further, when it is difficult to power supply both the primary drive device and the secondary drive device, the primary drive device is power supplied preferentially.

As the above description, when the input power supplied to the electric device 9 is more than ten times of the input power supplied to the electric compressor 10 via the inverter circuit 40, a variation of a voltage applied to the inverter circuit 40 from the DC power 20 via the pair of bus lines 30 readily becomes large according to an effect of the electric device 9. The condenser 60 is provided to reduce the variation of the voltage.

The condenser 70 is provided to cancel a surge or ripple generated during a switching of switching elements of the inverter circuit 40.

A coil 80 is interposed between a connection point of the condenser 60 on one bus line 30 and a connection point of the condenser 70 on the one bus line 30. The coil 80 is provided to reduce an interference between condensers 60 and 70 which are interposed between the bus lines 30 in parallel. It is an object to provide the coil 80 to change a resonant frequency generated by a relationship between the condenser 60 and the condenser 70.

The inverter circuit 40 includes three-phase arms which are a U-phase arm, a V-phase arm, and a W-phase arm that correspond to stator coils of the synchronous motor 12. The inverter circuit 40 converts a direct-current voltage inputted via the pair of bus lines 30 to an alternating-current voltage using a PWM modulation and outputs the alternating-current voltage.

The U-phase arm includes an upper arm is made from a switching element and a recirculating diode which are anti-parallel connected to each other, and a lower arm is made in the same manner as the upper arm. The upper arm and the lower arm are connected to each other in series. An output wire 45 extends from a connection part between the upper arm and the lower arm is connected to a motor coil. The V-phase arm and the W-phase arm are made in the same way as the U-phase arm, and output wires 45 extend from connection parts between the upper arms and the lower arms are connected to the motor coil.

The switching element can be an element such as an insulated gate bipolar transistor (IGBT). Further, each of the above arms made from the switching element and the diode may be a reverse conducting insulated gate bipolar transistor (RCIGBT) that is a power semiconductor having one chip in which the IGBT and a reverse conducting diode are integrated.

Since a filter circuit 31 includes two condensers 60 and 70 as a condenser element and the coil 80 as a coil element, the filter circuit 31 is an electrically resonant circuit electrically generating a relatively high resonance according to a frequency of a current flowing from the inverter circuit 40.

Figure 5:
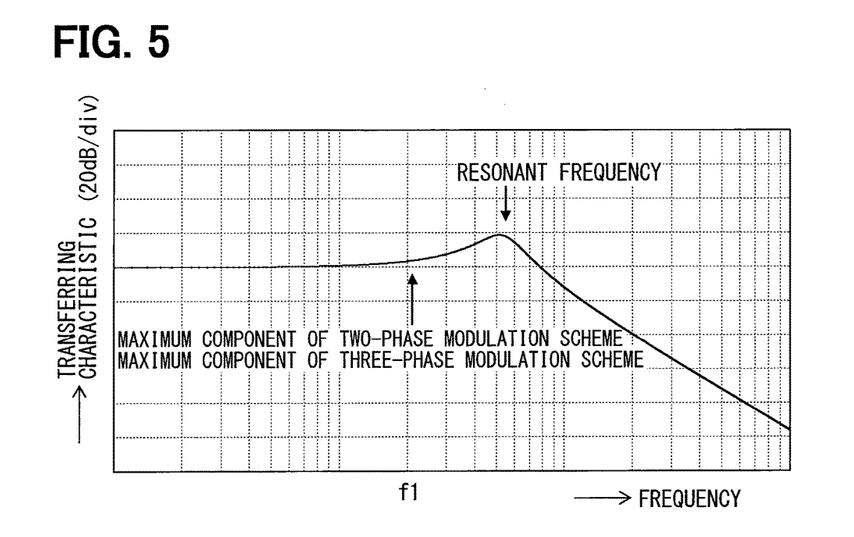
FIG. 5 is a graph showing a relationship between a transferring characteristic of a current flowing the coil according to a current ripple generated in an inverter and a maximum current of each of the modulation schemes, according to the embodiment.

A transferring characteristic of a current (that is, a current flowing through a part of the pair of the bus lines 30 between the condenser 60 and the condenser 70) flowing through the coil 80 of the filter circuit 31 according to a current ripple generated by the inverter circuit 40 with a switching operation of the switching element is indicated in FIG. 5. The filter circuit 31 is the electrically resonant circuit having the resonant frequency shown in FIG. 5.

A control device 100 is a driving circuit portion executing the switching operation of each switching element of the inverter circuit 40 and controlling a drive of the synchronous motor 12. The control device 100 receives a motor-coil current information detected by a current detector 90 provided on the pair of bus lines 30, generates a PWM wave (notch wave) that is a switching signal based on the motor-coil current information, and outputs the PWM wave to the inverter circuit 40.

Figure 2:
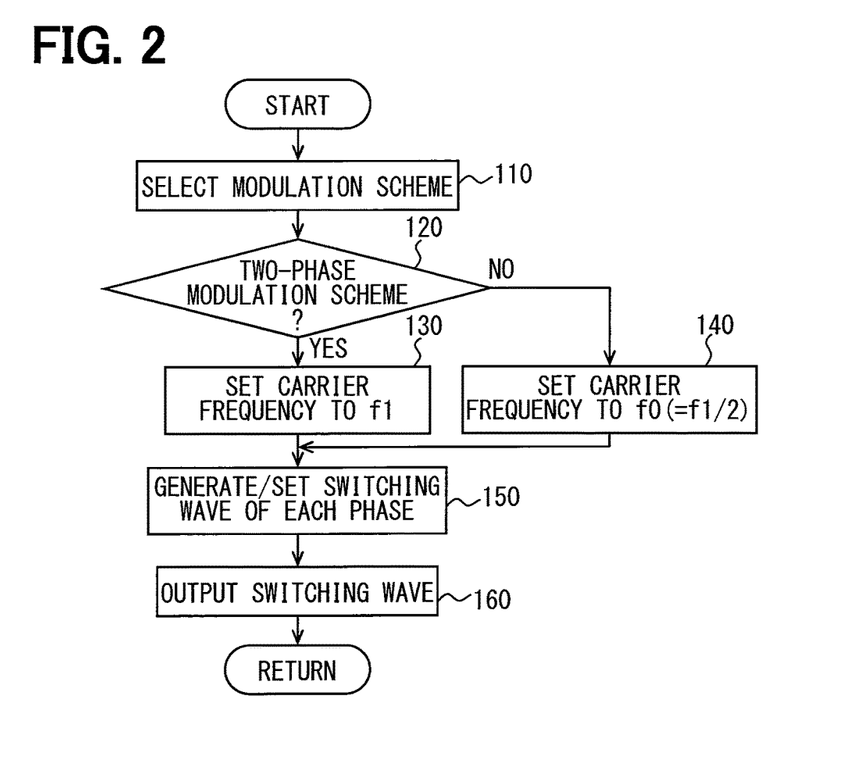
FIG. 2 is a flowchart showing a control operation of a control device of the motor driving device according to the embodiment.

As shown in FIG. 2, firstly, the control device 100 selects a modulation scheme to execute the PWM modulation at the inverter circuit 40 (step 110). At step 110, the control device 100 selects the modulation scheme according to a rotation speed of the synchronous motor 12. When an engine operates with a low speed that the rotation speed is less than a predetermined speed immediately after the engine starts, the synchronous motor 12 uses a three-phase modulation scheme for example. When an engine operates with a high speed in a steady state that the rotation speed exceeds a predetermined speed, the synchronous motor 12 uses a two-phase modulation scheme in which a switching element of one phase is fixed to be turned on or off for example.

When the control device 100 selects the modulation scheme at step 110, the control device 100 determines whether the modulation scheme is the two-phase modulation scheme (step 120). At step 120, when the control device 100 determines that the two-phase modulation scheme is selected (YES), the control device 100 sets a frequency of a reference carrier wave (carrier wave) of when a PWM wave (switching wave) is generated to f1 (step 130). On the other hand, at step 120, when the control device 100 determines that the three-phase modulation scheme is selected (No), the control device 100 sets the frequency of the reference carrier wave of when the PWM wave is generated to f0 (step 130). The reference carrier wave is made from a triangular wave, and f0 is a half of f1.

When step 130 or step 140 is executed, the control device 100 proceeds to step 150. At step 150, the control device 100 generates and sets the switching wave that switches the switching element of each arm by comparing a modulated wave that is of an applied voltage command sent to the motor coil of the synchronous motor 12 with the reference carrier wave. At step 150, the reference carrier wave set at step 130 or step 140 immediately before step 150 is used.

Next, the control device 100 outputs the switching wave set at step 150 to each arm to control an operation of the switching element (step 160). The control device 100 returns to step 110 to execute a control in a next one PWM period until step 160 is executed. For example, the control device 100 executes a flow shown in FIG. 2 every 50 µs and outputs the switching wave every one PWM period.

Figure 3:
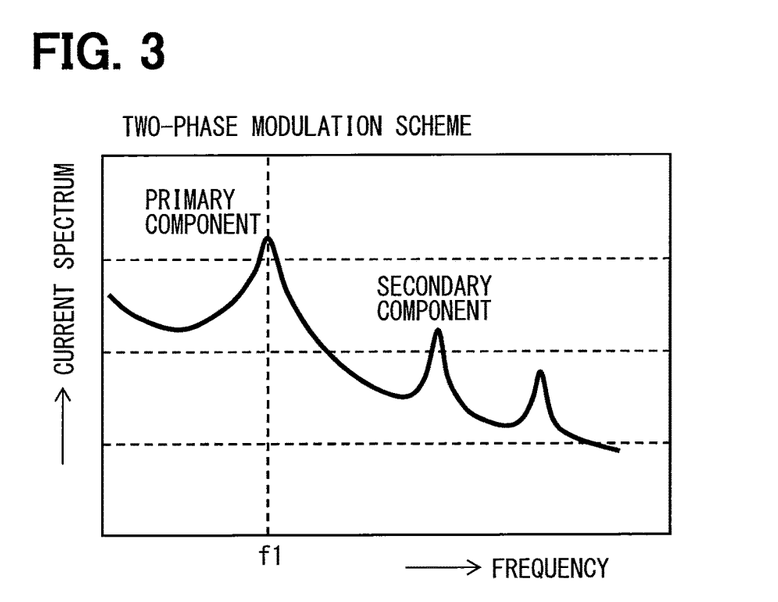
FIG. 3 is a graph showing a result of a current flowing through a coil under a frequency analysis in a case where the control device selecting a two-phase modulation scheme, according to the embodiment.
Figure 4:
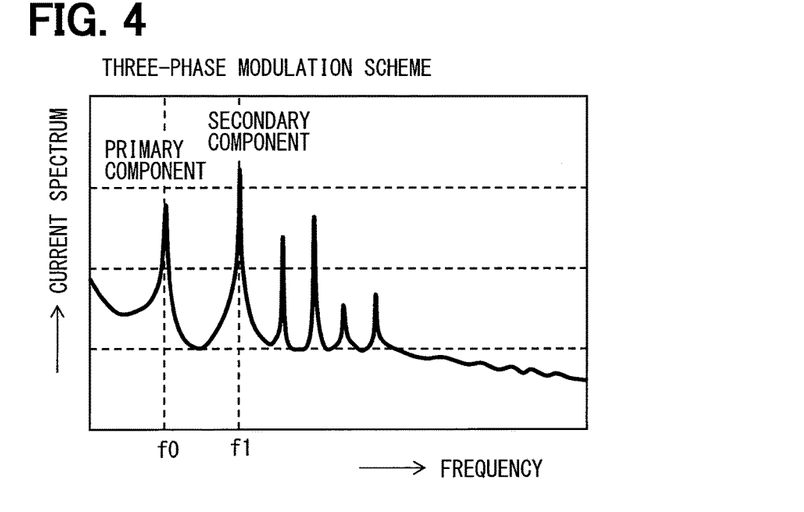
FIG. 4 is a graph showing a result of a current flowing through the coil under a frequency analysis in a case where the control device selecting a three-phase modulation scheme, according to the embodiment.

According to the above configuration and operation, when the control device 100 selects the two-phase modulation scheme to switch the switching element, a primary component corresponding to the frequency f1 is maximum in the current flowing through the coil 80 of the filter circuit 31 as shown in FIG. 3. On the other hand, when the control device 100 selects the three-phase modulation scheme to switch the switching element, since a frequency of the carrier wave is referred to as f0, a secondary component corresponding to the frequency f1 is maximum in the current flowing through the coil 80 of the filter circuit 31 as shown in FIG. 4. According to the present embodiment, the frequency of the carrier wave is referred to as a carrier-wave frequency.

Thus, when the two-phase modulation scheme or the three-phase modulation scheme is selected, a maximum component of a spectrum of the current flowing through the coil 80 of the filter circuit 31 is generated at the same frequency f1, and the frequency f1 is relatively remarkably deviated from the resonant frequency of the filter circuit 31 as shown in FIG. 5. Therefore, as shown in FIG. 6, the current ripple flowing through the coil 80 becomes relatively small.

Figure 7:
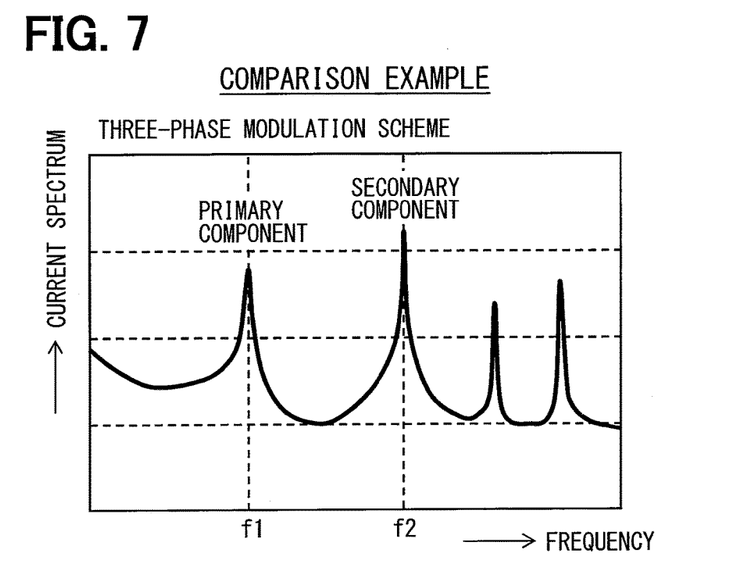
FIG. 7 is a graph showing a result of a current flowing through a coil under a frequency analysis in a case where a control device selecting a three-phase modulation scheme, according to a comparison example.
Figure 8:
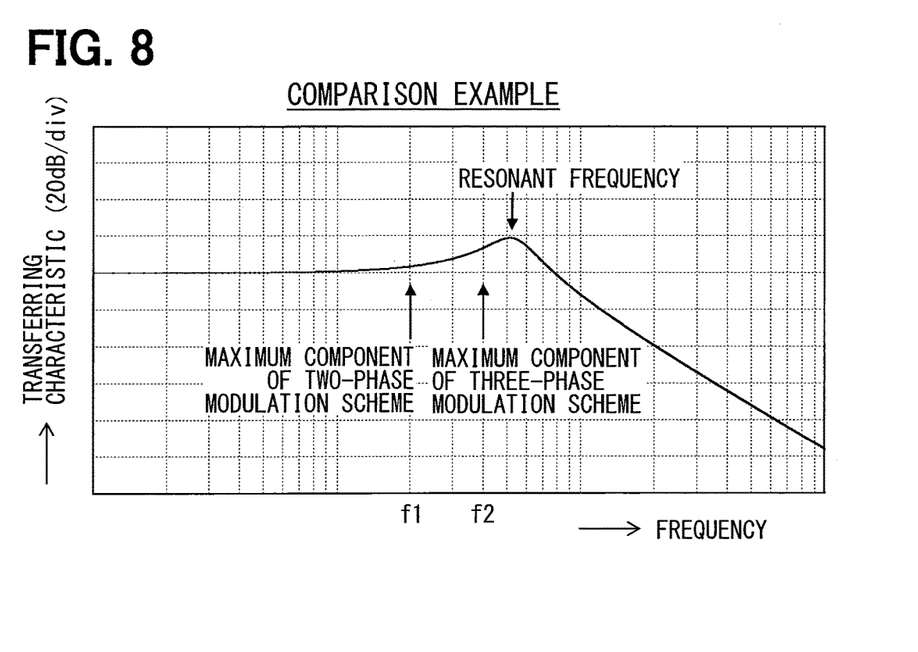
FIG. 8 is a graph showing a relationship between a transferring characteristic of a current flowing the coil according to a current ripple generated in an inverter and a maximum current of each of the modulation schemes, according to the comparison example.
Figure 9:
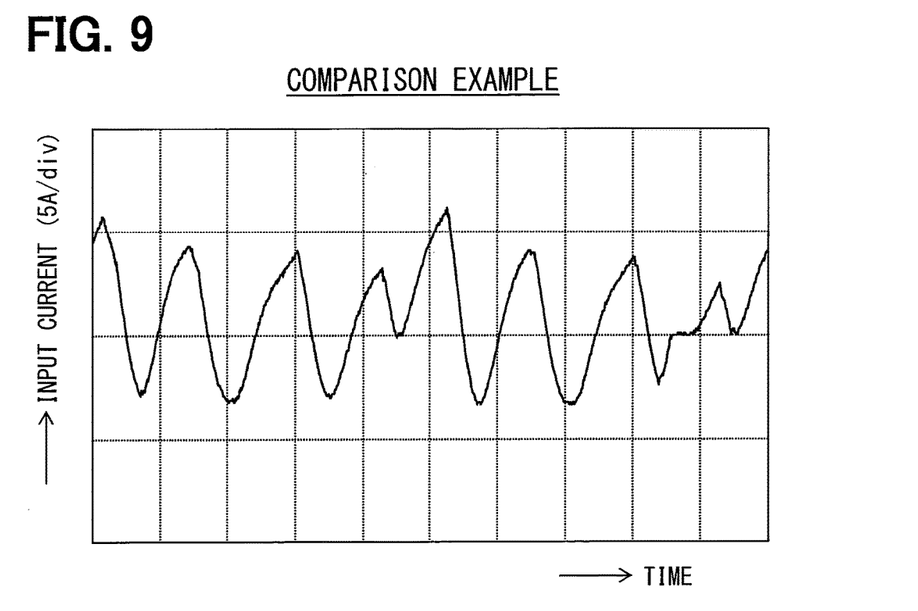
FIG. 9 is a graph showing an example of a waveform of a current flowing through the coil, according to the comparison example.

FIGS. 7 to 9 indicate a comparison example. When the three-phase modulation is selected to switch the switching element, and when the carrier-wave frequency is set to f1 as the same as that of when the two-phase modulation scheme is selected, the secondary component corresponding to the frequency f2 becomes maximum in the current flowing through the coil 80 of the filter circuit 31 as shown in FIG. 7.

Therefore, as shown in FIG. 8, when the three-phase modulation scheme is selected, the frequency f2 at which the maximum component of the spectrum of the current flowing through the coil 80 of the filter circuit 31 is generated is relatively close to the resonant frequency of the filter circuit 31. Thus, as shown in FIG. 9, the current ripple flowing through the coil 80 becomes relatively large.

Figure 6:
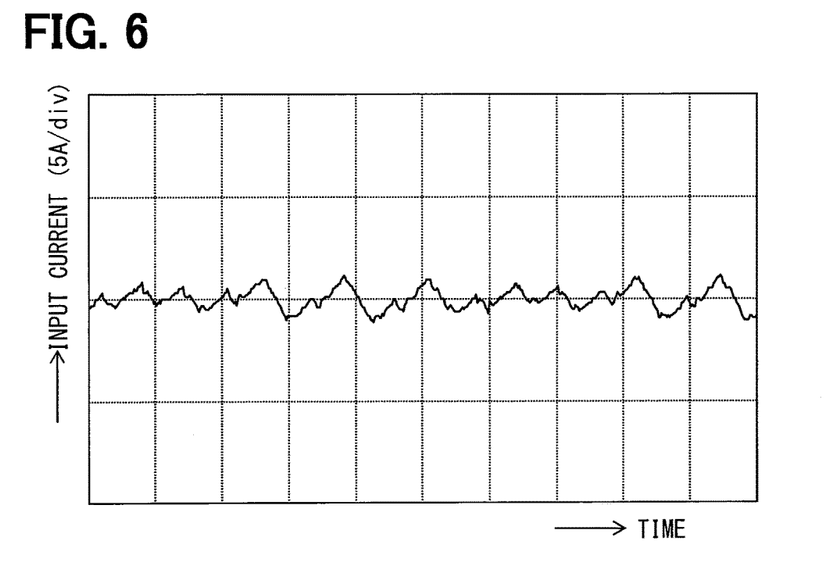
FIG. 6 is a graph showing an example of a waveform of a current flowing through the coil, according to the embodiment.

Comparing FIG. 6 with FIG. 9, according to the motor driving device of the present embodiment, the current ripple generated in the filter circuit 31 due to a resonance of the filter circuit 31 can be reduced. Therefore, damages applied to the condensers 60 and 70 or the coil 80 in the filter circuit 31 can be reduced.

The resonant frequency of the filter circuit 31 may slightly vary due to variations of characteristics of the condensers 60 and 70 and the coil 80 or due to a variation of a length of the pair of the bus lines 30 between the condenser 60 and the condenser 70. However, according to the motor driving device of the present embodiment, when the two-phase modulation scheme or the three-phase modulation scheme is selected, since the frequency f1 generating the maximum component of the spectrum of the current is relatively remarkably deviated from the resonant frequency of the filter circuit 31, an effect of a change of the resonant frequency is cancelled.

As the above description, according to the motor driving device of the present embodiment, the control device 100 is a device that selectively switches the modulation scheme of the PWM modulation from plural modulation schemes. Further, the pair of the bus lines 30 that is an example of the power supply path from the DC power 20 to the inverter circuit 40 is provided with the filter circuit 31 including the condensers 60 and 70 and the coil 80, and the filter circuit 31 is the electrically resonant circuit and switches the switching element.

As in the comparison example, the carrier-wave frequencies of the reference carrier waves of plural modulation schemes are set to be the same. In this case, the control device 100 executes a uniform frequency mode. In the uniform frequency mode, a modulation scheme, in which a current peak frequency that is a maximum value of a frequency component (amplitude) of the current flowing through the coil 80 during the switching of the switching element is nearest the resonant frequency of the filter circuit 31, is referred to as a resonant inducement modulation scheme. According to the present embodiment, the three-phase modulation scheme is the resonant inducement modulation scheme in the uniform frequency mode.

According to the present embodiment, when the control device 100 selects the resonant inducement modulation scheme that is the three-phase modulation scheme to execute the PWM modulation, the control device 100 generates the PWM wave by using the reference carrier wave that is different in carrier-wave frequency from the reference carrier waves of when other modulation schemes are selected such that the current peak frequency and the resonant frequency are more deviated from each other than those in the uniform frequency mode.

Then, when the PWM modulation is executed in the resonant inducement modulation scheme that most readily electrically resonates with the filter circuit 31 in the uniform frequency mode, the control device 100 changes the carrier-wave frequency such that the current peak frequency and the resonant frequency are deviated from each other relative to the uniform frequency mode, and uses the reference carrier wave that is different in carrier-wave frequency from the reference carrier waves of other modulation schemes. Therefore, in the modulation scheme in which a resonance is most readily generated in the uniform frequency mode, a resonance of the filter circuit can be reduced. In this case, even though the PWM modulation is selectively switched to other modulation schemes, the current ripple generated in the filter circuit 31 can be reduced.

According to the present embodiment, plural phases of the synchronous motor 12 are three phases, and plural modulation schemes include the two-phase modulation scheme and the three-phase modulation scheme. Further, when the control device 100 selects one of the two schemes that are the two-phase modulation scheme and the three-phase modulation scheme to execute the PWM modulation such that the current peak frequency of the one of the two schemes which is the resonant inducement modulation scheme becomes further close to the current peak frequency of the other one of the two schemes than that in the uniform frequency mode, the control device 100 generates the PWM wave by using the reference carrier wave that is different in carrier-wave frequency from the reference carrier wave of when the other one of the two schemes is selected.

Then, when the control device 100 selects one of the two schemes which readily electrically resonates with the filter circuit 31 in the uniform frequency mode to execute the PWM modulation, the control device 100 uses the reference carrier wave that is different in carrier-wave frequency from the reference carrier wave of the other modulation scheme, such that the current peak frequency and the resonant frequency are further deviated from each other than that in the uniform frequency mode and the current peak frequency of the two-phase modulation scheme and the current peak frequency of the three-phase modulation scheme are approximated to each other.

Therefore, in the modulation scheme in which the resonance is readily generated in the uniform frequency mode, the resonance of the filter circuit 31 can be reduced as the same as in the modulation scheme in which the resonance is difficultly generated. Thus, even though the PWM modulation is selectively switched to the two-phase modulation scheme or the three-phase modulation scheme, the current ripple generated in the filter circuit 31 can be surely reduced.

According to the present embodiment, the resonant inducement modulation scheme in the uniform frequency mode is the three-phase modulation scheme. Further, when the control device 100 selects the three-phase modulation scheme to execute the PWM modulation, the control device 100 generates the PWM wave by using the reference carrier wave having the carrier-wave frequency half of that of when the two-phase modulation scheme is selected to execute the PWM modulation.

Then, the current peak frequency (the primary component f1 as shown in FIG. 3) of when the two-phase modulation scheme is selected and the current peak frequency (the secondary component f1 as shown in FIG. 4) of when the three-phase modulation scheme is selected can be matched to each other. Therefore, in the three-phase modulation scheme in which the resonance is readily generated in the uniform frequency mode, the resonance of the filter circuit 31 can be reduced as the same as the two-phase modulation scheme in which the resonance is difficultly generated. Thus, even though the PWM modulation is selectively switched to the two-phase modulation scheme or the three-phase modulation scheme, the current ripple generated in the filter circuit 31 can be further surely reduced.

(Other Embodiment)

As the above description, a preferable embodiment of the present disclosure is described. However, the present disclosure is not limited to the embodiment mentioned above, and can be applied to various embodiments within the spirit and scope of the present disclosure.

According to the above embodiment, when the control device 100 selects the three-phase modulation scheme to execute the PWM modulation, the control device 100 sets the current peak frequency to f1 by using the reference carrier wave having the carrier-wave frequency half of that of when the two-phase modulation scheme is selected to execute the PWM modulation. However, it is not limited. Even though the carrier-wave frequency of when the three-phase modulation scheme is selected is not reduced to a half of that of when the two-phase modulation scheme is selected, the control device 100 may control the current peak frequency of the three-phase modulation scheme to be close to that of the two-phase modulation scheme by further separating the current peak frequency of the three-phase modulation scheme from the resonant frequency than that in the uniform frequency mode. In this case, since the frequency is not significantly decreased when the three-phase modulation scheme is selected, a generation of sound or a generation of oscillation may be reduced.

According to the above embodiment, the three-phase modulation scheme is the resonant inducement modulation scheme of the uniform frequency mode. However, the resonant inducement modulation scheme of the uniform frequency mode is not limited to the three-phase modulation. For example, the current peak frequencies of the three-phase modulation scheme and the two-phase modulation scheme are both greater than the resonant frequency in the uniform frequency mode, and the two-phase modulation scheme may be the resonant inducement modulation scheme of the uniform frequency mode. In this case, the carrier-wave frequency of when the two-phase modulation scheme is selected is increased to be further deviated from the resonant frequency than that in the uniform frequency mode.

According to the above embodiment, the control device 100 selectively switches between the two-phase modulation scheme and the three-phase modulation scheme. However, the control device 100 is not limited to the above. The control device 100 may selectively switches among three or more modulation schemes. For example, when the control device 100 selectively switches among three modulation schemes, the control device 100 at least selects a modulation scheme in which the carrier-wave frequency of the resonant inducement modulation scheme is further deviated from the resonant frequency than that in the uniform frequency mode.

Further, the three modulation schemes include a first modulation scheme (resonant inducement modulation scheme), a second modulation scheme, and a third modulation scheme. The current peak frequency of the first modulation scheme is closer to the resonant frequency than that of the second modulation scheme, and the current peak frequency of the second modulation scheme is closer to the resonant frequency than that of the third modulation scheme. When the control device 100 selectively switches among the first modulation scheme, the second modulation scheme, and the third modulation scheme, only the carrier-wave frequency of when the first modulation scheme is selected may be deviated from the resonant frequency relative to the uniform frequency mode. In this case, the second modulation scheme and the third modulation scheme are other modulation schemes. Alternatively, the carrier-wave frequency of when the first modulation scheme or the second modulation scheme is selected may be deviated from the resonant frequency relative to the uniform frequency mode. In this case, the third modulation scheme is the other modulation scheme.

Plural modulation schemes of the present disclosure are not limited to the two-phase modulation scheme and the three-phase modulation scheme, and other modulation schemes may be applied to the present disclosure. For example, a one-phase modulation scheme can be used as one of the modulation schemes.

According to the above embodiment, the filter circuit 31 is constructed by the condensers 60 and 70, the coil 80, and wirings connected to the condensers 60 and 70 and the coil 80. However, the present disclosure is not limited to the above configuration. The filter circuit should include a condenser element and a coil element. For example, the filter circuit 31 is provided without the coil 80 made from a coil body, and the pair of the bus lines 30 between the condensers 60 and 70 becomes the coil element according to a length of the pair of the bus lines 30 or a surrounding shape of the pair of the bus lines 30.

Alternatively, the filter circuit may further include an additional element to achieve a shift of the resonant frequency or an attenuation of a resonant characteristic, relative to the filter circuit including the condensers 60 and 70 the coil 80 in the above embodiment. In this case, a configuration of the filter circuit including the additional element becomes complicated, and an increasing of a size of the filter circuit is generated. According to the above embodiment, the motor driving device is applied to a vehicle. When a restriction of a mounting space is large, it is significantly large in an improvement effect to prevent the configuration of the filter circuit from being complicated and the increasing of the size of the filter circuit from being generated, by applying the present disclosure.

According to the above embodiment, the synchronous motor 12 driven by the motor driving device is a three-phase motor. However, the synchronous motor 12 is not limited to the three-phase motor. For example, the synchronous motor 12 may be a motor having four or more phases.

According to the above embodiment, the motor driving device drives a motor which uses a compression mechanism of a compressor disposed in the heat pump circle of the vehicle air-conditioner device as a load. However, the motor driving device is not limited to drive the above motor.

What is claimed is:

1. A motor driving device comprising:
an inverter circuit including switching elements corresponding to motor coils of plural phases of a motor;
a control device having a driving circuit that switches the switching elements by using a PWM wave generated by a PWM modulation based on a comparison of a reference carrier wave and a modulation wave that is of an applied voltage command sent to each of the phases, the control device controlling the inverter circuit to convert a direct-current voltage to an alternating-current voltage by the switching and to output the alternating-current voltage to the motor coils; and
a filter circuit is disposed in a power supply path from a supply source of the direct-current voltage to the inverter circuit, the filter circuit including a condenser element and a coil element, wherein
the control device selectively switches a scheme of the PWM modulation among a plurality of modulation schemes,
the filter circuit becomes an electrically resonant circuit according to the switching,
each modulation scheme of the PWM modulation has a current peak frequency that is a maximum value of a frequency component of a current flowing through the coil element during the switching,
one of the modulation schemes is a resonant inducement modulation scheme that has the current peak frequency that is closer to a resonant frequency of the filter circuit than that of an other modulation scheme in a uniform frequency mode where the reference carrier waves of the modulation schemes in the uniform frequency mode are each set to have the same carrier wave frequency, and
the control device uses the resonant inducement modulation scheme in a mode, other than the uniform frequency mode, where the control device generates the PWM wave by using the reference carrier wave that is different in carrier-wave frequency from the reference carrier wave of the other modulation scheme such that a difference between the current peak frequency of the resonant inducement modulation scheme and the resonant frequency becomes greater than that in the uniform frequency mode.

2. The motor driving device according to claim 1, wherein
the plural phases are three phases,
the modulation schemes include a two-phase modulation scheme and a three-phase modulation scheme,
one of the two schemes that are the two-phase modulation scheme and the three-phase modulation scheme is the resonant inducement modulation scheme, and
when the control device uses the one of the two schemes to execute the PWM modulation, the control device generates the PWM wave by using the reference carrier wave that is different in carrier-wave frequency from the reference carrier wave of the other one of the two schemes such that the current peak frequency of the one of the two schemes becomes closer to the current peak frequency of the other one of the two schemes than that in the uniform frequency mode.

3. The motor driving device according to claim 2, wherein the resonant inducement modulation scheme is the three-phase modulation scheme, and when the control device uses the three-phase modulation scheme to execute the PWM modulation, the control device generates the PWM wave by using the reference carrier wave having the carrier-wave frequency half of the carrier-wave frequency of the reference carrier wave of the two-phase modulation scheme.

4. The motor driving device according to claim 1, wherein when the control device uses the modulation scheme other than the resonant inducement modulation scheme to execute the PWM modulation, the control device generates the PWM wave by using the reference carrier wave that has the carrier-wave frequency that is the same as the carrier-wave frequency in the uniform frequency mode.

5. The motor driving device according to claim 4, wherein the control device selects the scheme of the PWM modulation from among the plurality of modulation schemes based on a rotation speed of the motor.

* * * * *